US00RE42220E

(19) United States
(12) Reissued Patent
Clinch et al.

(10) Patent Number: US RE42,220 E
(45) Date of Reissued Patent: Mar. 15, 2011

(54) MICROSCOPY

(75) Inventors: Noah Clinch, Salt Spring Island (CA); John R. Maddison, Crowborough (GB)

(73) Assignee: Hamamatsu Photonics K.K., Hamamatsu-shi, Shizuoka (JP)

(21) Appl. No.: 11/657,635

(22) Filed: Jan. 25, 2007

Related U.S. Patent Documents

Reissue of:
(64) Patent No.: 6,847,729
Issued: Jan. 25, 2005
Appl. No.: 09/553,043
Filed: Apr. 20, 2000

(30) Foreign Application Priority Data

Apr. 21, 1999 (EP) ..... 99303070
Sep. 24, 1999 (EP) ..... 99307555

(51) Int. Cl.
*G06K 9/00* (2006.01)
*G06K 9/32* (2006.01)

(52) U.S. Cl. ..... 382/128; 382/299
(58) Field of Classification Search ..... 382/128, 382/282, 291, 299
See application file for complete search history.

(56) References Cited

U.S. PATENT DOCUMENTS 4,513,438 A 4/1985 Graham et al.

(Continued)

FOREIGN PATENT DOCUMENTS

| | | |
|---|---|---|
| CH | 490 384 | 8/2000 |
| DE | 42 26 523 | 2/1994 |
| DE | 196 33 997 | 3/1998 |
| DE | 198 12 599 | 9/1999 |
| EP | 0 175 549 | 3/1986 |
| EP | 0 380 904 | 8/1990 |
| EP | 0 796 005 | 9/1997 |
| EP | 0 994 433 | 4/2000 |
| JP | 05-076005 | 3/1993 |
| JP | 11-211988 | 8/1999 |
| JP | 2002-296010 | 10/2002 |
| WO | 97/25678 | 7/1997 |
| WO | WO 98/20445 | 5/1998 |
| WO | 98/39728 | 9/1998 |
| WO | WO 98/44446 | 10/1998 |
| WO | 99/13360 | 3/1999 |
| WO | WO 00/36440 | 6/2000 |

OTHER PUBLICATIONS

M. A. Hunt et al., "Circumference imaging for optical based identification of cylindrical and conical objects," Feb. 1, 1997.

K. Berland et al., "Electronic Cameras for Low–Light Microscopy," Methods in Cell Biology, 1998, vol. 56, Chapter 2, pp. 19–44.

(Continued)

*Primary Examiner*—Brian P Werner
(74) *Attorney, Agent, or Firm*—Drinker Biddle & Reath LLP

(57) ABSTRACT

A method of telemicroscopy comprises the step of preparing a specimen on a microscopy slide. The slide is placed upon the stage of a microscope equipped with digital imaging apparatus and motorised stage and the specimen imaged to obtain a composite high resolution image of the whole specimen. A relatively low resolution copy of that image is obtained and stored in a datastore. The method further comprises the steps of allowing access to the datastore from a terminal transferring the low resolution image to the terminal and displaying the image upon a monitor selecting by means of the remote terminal, as desired, an area of the low resolution image and transferring corresponding high resolution image data for that area from the datastore to the terminal.

43 Claims, 3 Drawing Sheets

U.S. PATENT DOCUMENTS

| | | | | | |
|---|---|---|---|---|---|
| 4,673,988 | A | | 6/1987 | Jansson et al. | |
| 4,742,558 | A | | 5/1988 | Ishibashi et al. | |
| 4,757,550 | A | | 7/1988 | Uga | |
| 4,777,525 | A | * | 10/1988 | Preston, Jr. | 348/111 |
| 5,216,596 | A | | 6/1993 | Weinstein | |
| 5,263,136 | A | | 11/1993 | DeAguiar et al. | |
| 5,276,550 | A | | 1/1994 | Kojima | |
| 5,297,034 | A | | 3/1994 | Weinstein | |
| 5,394,455 | A | * | 2/1995 | Roeck et al. | 378/98.3 |
| 5,416,609 | A | | 5/1995 | Matsuda et al. | |
| 5,432,871 | A | | 7/1995 | Novik | |
| 5,434,629 | A | | 7/1995 | Pearson et al. | |
| 5,550,937 | A | | 8/1996 | Bell et al. | |
| 5,578,832 | A | | 11/1996 | Trulson et al. | |
| 5,604,344 | A | | 2/1997 | Finarov | |
| 5,650,813 | A | | 7/1997 | Gilblom et al. | |
| 5,796,861 | A | * | 8/1998 | Vogt et al. | 382/128 |
| 5,825,532 | A | | 10/1998 | Mochizuki et al. | |
| 5,895,915 | A | | 4/1999 | DeWeerd et al. | |
| 5,939,278 | A | * | 8/1999 | Boon et al. | 435/7.23 |
| 6,031,930 | A | | 2/2000 | Bacus et al. | |
| 6,049,421 | A | * | 4/2000 | Raz et al. | 359/394 |
| 6,215,892 | B1 | | 4/2001 | Douglass et al. | |
| 6,262,838 | B1 | * | 7/2001 | Montagu | 359/392 |
| 6,272,235 | B1 | * | 8/2001 | Bacus et al. | 382/133 |
| 6,452,625 | B1 | | 9/2002 | Kapitza | |
| 6,606,413 | B1 | * | 8/2003 | Zeineh | 382/232 |
| 6,674,881 | B2 | | 1/2004 | Bacus et al. | |
| 6,687,419 | B1 | | 2/2004 | Atkin | |
| 6,711,283 | B1 | * | 3/2004 | Soenksen | 382/133 |
| 6,716,588 | B2 | | 4/2004 | Sammak et al. | |
| 6,847,729 | B1 | | 1/2005 | Clinch et al. | |
| 2001/0012069 | A1 | | 8/2001 | Derndinger et al. | |
| 2002/0061127 | A1 | | 5/2002 | Bacus et al. | |
| 2002/0085744 | A1 | | 7/2002 | Domanik et al. | |
| 2004/0184678 | A1 | | 9/2004 | Maddison | |
| 2008/0055405 | A1 | | 3/2008 | Maddison | |

OTHER PUBLICATIONS

Matthias Nagomi of Helmstedt, "Implementation of X Window applications for image acquisition and control of the Heidelberg wave field microscope." Faculty of Physics and Astronomy Reprecht–Karls University Heidelberg, Dissertation in the University Course of Physics, Sep. 23, 1996, pp. 1–104 (with English–language translation).

J. Bradi et al., "Microscope Control Image Acquisition and Visualization in a Network Environment: Towards "Online" Telemicroscopy", Institute of Applied Physics, University of Heidelberg, vol. 4 No. 2 (1997), pp. 241–242 Cell Vision.

Bernhard Schneider et al., "High Precision Localization of Fluorescent Targets in the Nanometer Range By Spatially Modulated Excitation Fluorescence Microscopy", Institute of Applied Physics, University of Heidelberg, Fluorescence Microscopy and Fluorescent Probes, vol. 2, 1998.

B. Schneider et al., "A Dual–Laser, Spatially Modulated Illumination Fluorescence Microscope", Institute of Applied Physics, University of Heidelberg, Microscopy and Analysis, Jan. 1999, pp. 5–7.

Renato Ferreira et al., "The Virtual Microscope", American Medical Informatics Association, Oct 1997, 5 pages.

Dr. Joachim Bradl et al., "Mikroskopsteuerung, Bildaufnahme "online" Telemikroskopi", pp. 1–12 (with English–language translation) Nov. 1996.

Ivar Nordrum, "Real–time Diagnoses in telepathology", 4$^{th}$ European Congress on Telepathology, Norway, Adv Clin Path, 1998, pp. 127–178.

PACS, Basic Principles and Applications, Chapters 7, 8 and 12, ISBN: 0–471–25393–6; Jan. 1999.

Brown, L.G., "A Survey of Image Registration Techniques", ACM Computing Surveys, New York, NY, vol. 24, No. 4, Dec. 1, 1992, pp. 325–376.

* cited by examiner

MICROSCOPY

Matter enclosed in heavy brackets [ ] appears in the original patent but forms no part of this reissue specification; matter printed in italics indicates the additions made by reissue.

The present invention relates to telemicroscopy and microscopy training.

Telemedicine, by which a range of data, such as x-rays or ECG traces, relating to a patient is transmitted from one location to another for diagnosis or a second opinion, is the focus of much attention because of its potential to improve the quality of healthcare while reducing costs. There have been many attempts at developing telemedical applications involving the use of microscopes, such as telepathology and telecytology. All involve the capture of digital or analogue images from a microscope and transmission of these images to a remote site for the purpose of a second opinion or remote diagnosis. However, as will be described, none of the existing systems has been entirely satisfactory.

A fundamental problem in the field of telemicroscopy is that the field of view of the microscope is tiny in relation to the size of the specimen on the microscope slide. By way of example, a typical cytology 'smear' will occupy an area of at least 20 mm by 50 mm, that is 1000 $mm^2$. The field of view of a typical 20× magnification objective lens is only about 0.4 mm by 0.4 mm, or 0.16 $mm^2$. The entire image can therefore be considered to be formed by over 6000 distinct fields. A remote consultant will not want to make a diagnosis on the basis of just a few images selected by another worker, he will want to have access to the whole of the slide and to be able to change or have changed the magnification as and where he wishes.

The simplest solution to this problem is a procedure known as static tele-microscopy. In its very basic form, all that is required is a camera coupled to the microscope, some basic software, a network connection such as via the Internet to a remote display, and means for voice communication between the two locations. The microscope is operated by a local worker who will typically, based on their own knowledge, select an initial area for review by the remote consultant. An image of that area will be acquired and transmitted to the remote consultant's monitor. Based upon what he can see, he relays instructions over the telephone to the local worker—left, right, up, down, increase magnification, etc. Further images are acquired and relayed to the consultant until he is satisfied that he has sufficient information upon which to base his diagnosis. Such static telepathology systems have the virtue of simplicity and low cost. However, trials have repeatedly confirmed that it is unsatisfactory in practice to rely upon a few fixed images and few consultants will be prepared to offer an opinion or make a diagnosis on this basis.

An improved system is known as dynamic telemicroscopy. Essentially, once the slide has been prepared locally, the microscope itself is operated remotely by the remote consultant. Examples are shown in U.S. Pat. No. 5,216,596 and U.S. Pat. No. 5,297,034. An example has also been placed on public access via the Internet by the Department of Pathology at the Charite Hospital in Berlin (http://amba.charite.de/telemic/index.html.). However, such on-line systems are expensive both in terms of buying the equipment and in terms of the consultant's time. These systems also need high bandwidth telecommunications, typically at least 384 kbits/sec for even only moderately satisfactory use. Whilst the consultant has full control over the microscope, there are delays whilst instructions are relayed to the microscope, the microscope is adjusted in accordance with those instructions, and the new image is obtained and relayed to the consultant. Such systems cannot strictly be considered to operate in real-time. For a comparison, whilst a consultant operating a local microscope could perhaps examine a sample and provide a diagnosis in a straightforward case in around a minute or perhaps 3 or 4 minutes for a more involved diagnosis, whereas even with dynamic telemicroscopy and experienced operators each examination can take in the order of ten minutes or so.

There is therefore a need for an improved method of telemicroscopy.

The invention also relates to the area of microscopy training, and particularly to the area of teaching of diagnostic methods employing microscopy.

At present training in diagnostic microscopy performed either by circulating prepared sections on glass slides formed by the circulation of electric microscopy images of a data storage medium such as CD ROM. The former of these two approaches is time consuming and inconvenient, particularly because samples get misplaced or damaged in transit. Both methods have the further disadvantage that there is both specific monitoring of whether or not a student performs a diagnosis simply by chance or by incorrect methods, meaning that both are limited teaching tools.

In the context of telemicroscopy and indeed any form of microscopy where images are displayed on a monitor rather than viewed directly by the eye, it is perhaps misleading to talk in terms of magnification. If an image is obtained and displayed full screen on a 17 inch computer monitor, the magnification will be greater than if the same image is displayed full screen on a 15 inch monitor. The resolution will, however, be the same. Accordingly, the term resolution is a better descriptor of the amount of information given in a particular image and relates, in the context of a digital camera, to the number of pixels of the CCD device per unit area of field of view.

According to the present invention, there is provided, in one aspect, a method of telemicroscopy comprising the steps of: preparing a specimen on a microscopy slide; placing the slide upon the stage of a microscope equipped with digital imaging apparatus and motorised stage; imaging the specimen to obtain a composite high resolution image of the whole specimen; digitally obtaining a relatively low resolution copy of that image; and storing the images in a datastore; wherein the method further comprises the steps of allowing access to the datastore from a terminal; transferring the low resolution image to the terminal and displaying the image upon a monitor; selecting by means of the remote terminal, as desired, an area of the low resolution image and transferring corresponding high resolution image data for that area from the datastore to the terminal.

The terminal may be a remote terminal.

The method may comprise the step of recording the areas of the low resolution image that are selected, for review of performance of a person performing the method.

In a second aspect, the present invention provides a telemicroscopy apparatus comprising a microscope provided with a digital imaging apparatus and a motorised stage which can be controlled to obtain a digital image or plurality of such images, at a desired high resolution, of an entire specimen placed upon the stage; image processing means to obtain a low resolution copy of the image of the specimen; storage means to store the images obtained; and means for transferring, in use, image data to a terminal in response to requests therefrom.

Preferably, the digital imaging apparatus is a digital camera, or else an analogue video camera provided with appropriate digitiser hardware. The apparatus may comprise means for moving the objective lens of the microscope in order to provide automatic focussing.

In a preferred embodiment, a continuous sequence of successive images of the specimen is obtained by advancing the field of view of the objective lens of the microscope stepwise across the specimen and acquiring an image of each field of view. The objective lens is selected to ensure sufficient resolution in the images of the specimen and sufficient images are captured and stored to cover the whole area of the specimen on the microscope stage.

The apparatus may comprises means for recording what image data is requested for review of the performance of a user. The recording means maybe a data storage disk, such as a floppy disk.

With a knowledge of the pixel size and number in the imaging apparatus used and the calibrated magnification of the objective of the microscope, the computer moves the stage such that adjacent images are effectively continuous in the two dimensional specimen plane, and can be thought of as 'tiles' in a very large composite 'montage' virtual image.

The above and other aspects of the present invention will now be described in further detail, by way of example only, with reference to the accompanying figures, in which.

Figure 1:
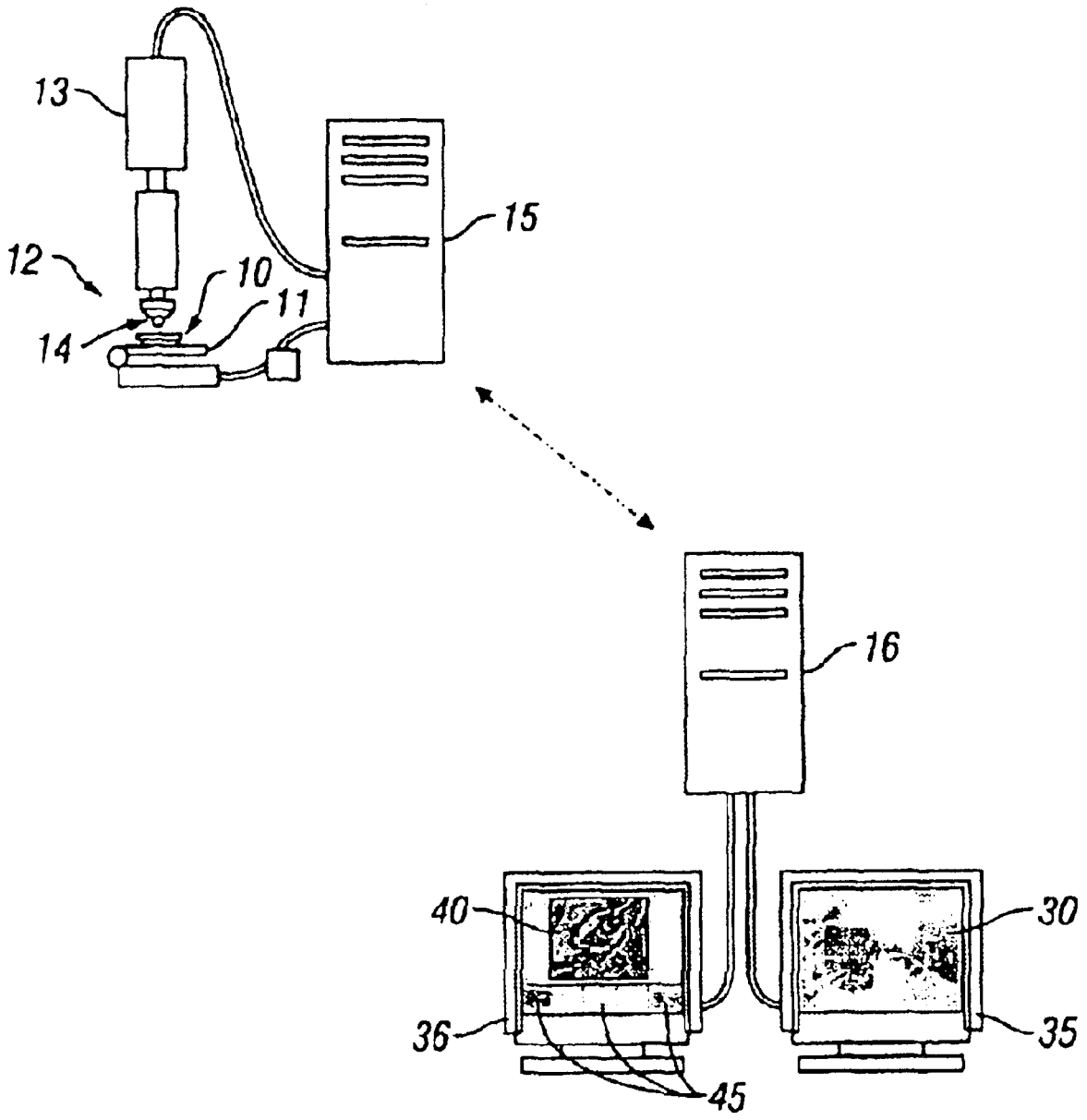
FIG. 1 illustrates schematically an embodiment of the apparatus in accordance with the present invention.

Referring to the Figures, a biopsy sample for analysis is taken and mounted upon a microscope slide 10 in a conventional manner. The specimen slide 10 is placed upon a motor driven stage 11 of a microscope 12 fitted with a camera 13, typically a digital, high resolution CCD camera of diagnostic quality—at least 1024×1024 pixels, 24 bit colour. The stage is adjustable in three dimensions with respect to the focal axis of the objective. This is typically achieved with a computer 16 controlled motorised movable stage 11, but could equally well, if unconventionally, be achieved with a static stage and a movable objective.

The objective lens 14 is selected according to the maximum desired resolution for the task in hand—typically 10×, 20× or 40×. The complete specimen is imaged by capturing an image of a first field (or area of the specimen) 20, advancing the stage to an adjacent field 21, capturing an image of that field, indexing to the next field 22 and so on (referred to as scanning). The individual field images 20, 21, 22 etc are stored on disk as part of a single large file or may be digitally compressed and stored electronically representing a high resolution virtual image of the original slide specimen. At the same time, a decimated copy of the very large image is created to represent a low resolution navigation map 30. Typically, the number of pixels in the low resolution map 30 will be the same as that in each of the original images 20, 21, for example 1024×1024. The total time for acquisition of the collection of high resolution images will typically be around 5–20 minutes, depending, of course, upon the specimen area to be scanned and the field of view of the objective lens.

When scanning with the high power objective, a problem is often encountered in that it is difficult to drive the motorised stage, such that it is normal to the optical axis of the microscope. Indeed, microscope slides are not perfectly flat. Because of this, the need arises to refocus the microscope periodically when scanning a specimen. Refocussing adds significantly to overall scan time. This can be overcome with the present invention by means of a piezo-electric driver, or other objective lens moving device, rather than requiring the movement of the motorised stage relative to a fixed objective lens.

This occurs before the consultant becomes involved and so maintains a high efficiency in terms of consultant time.

In practice, based on a knowledge of the pixel size and number in the camera and the calibrated magnification of the objective of the microscope, the distance by which the stage must move between each image acquisition is calculated. The stage is moved to the co-ordinates of the selected starting point and the first image is acquired. The image is compressed and stored to disk and a low-resolution tile is made from that image. With a knowledge of where the tile image originated, the tile is "pasted" onto a navigation map matrix and stored. The stage is then advanced to the next co-ordinates and the next image is acquired.

By making use of multi-thread software design, it is possible to optimise scan time by arranging for image compression and storage to run in parallel with stage movement and image acquisition.

The microscope stage 11 and the CCD camera 13 are controlled by appropriate hardware and software of the server 15, in a generally conventional manner.

Figure 2:
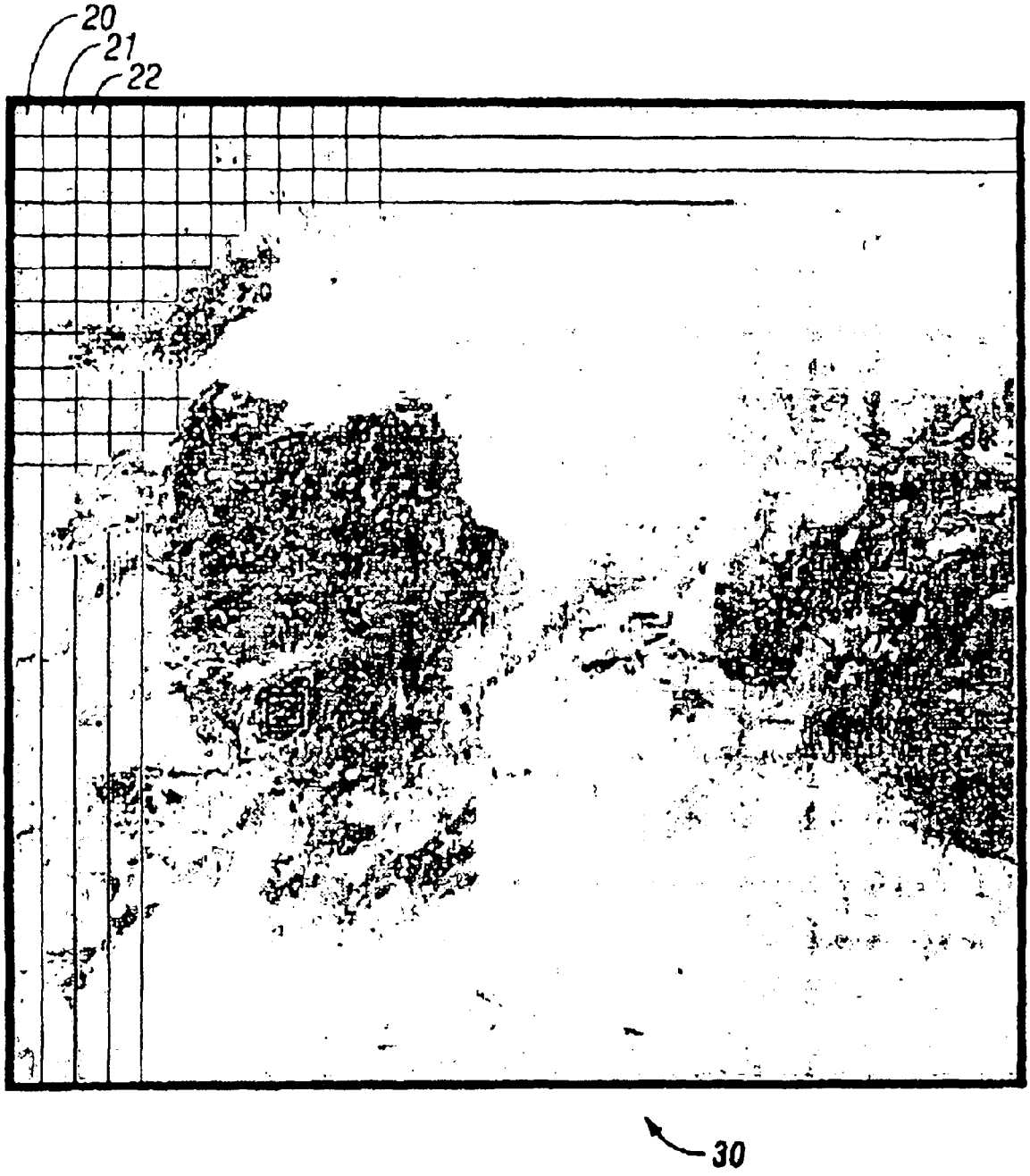
FIG. 2 is complete navigational map of a sample on a microscope slide which has been imaged in accordance with an embodiment of the method of the present invention.
Figure 3:
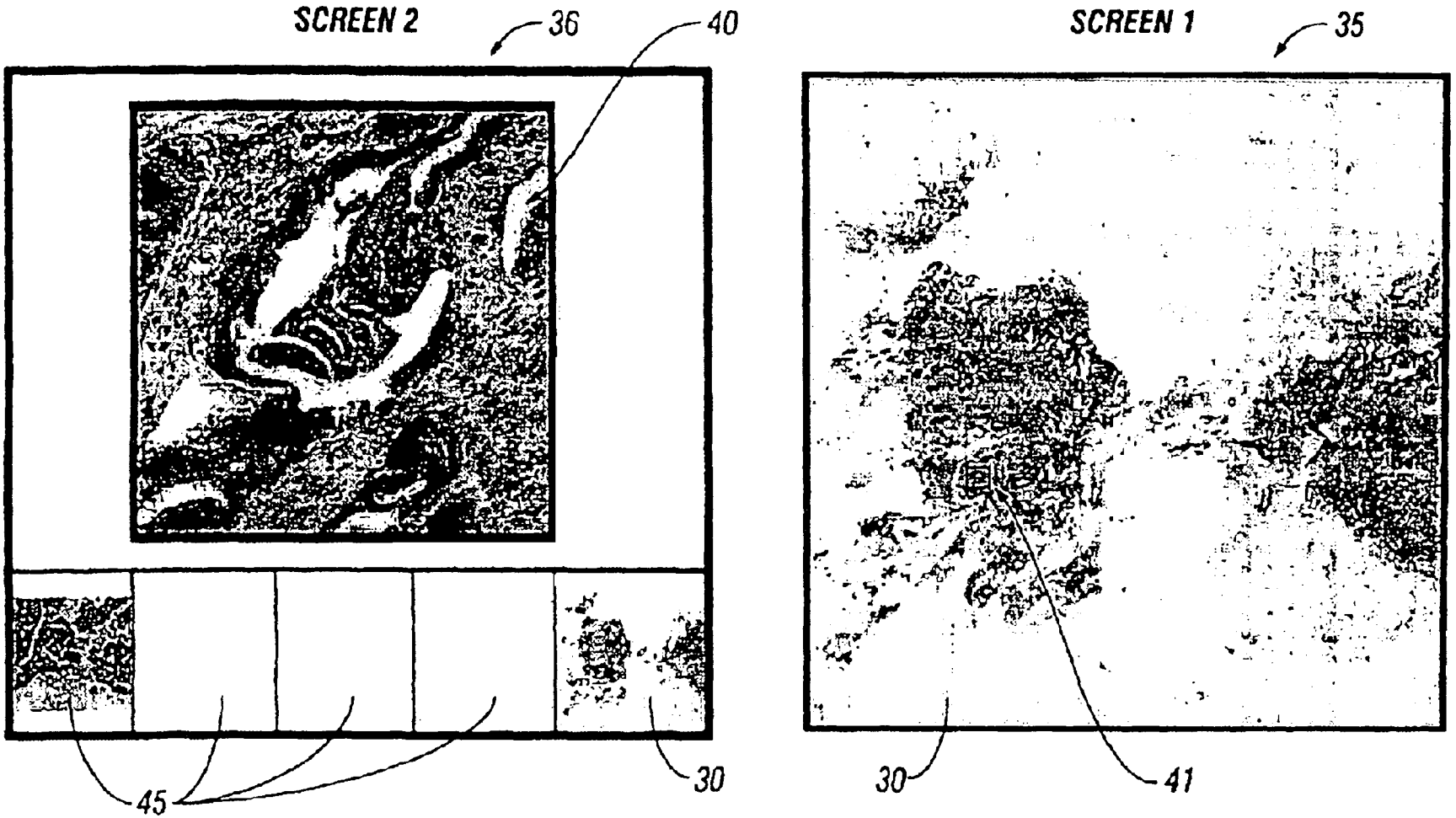
FIG. 3 illustrates in further detail one aspect of the embodiment of FIG. 1.

As is evident from the image shown in FIG. 2, unevenness in specimen illumination may lead to a certain degree of shading around the periphery of each field image. If desired, the high resolution image can be digitally processed to remove this shading. However, it is envisaged that consultants will generally prefer to see a "raw" image for fear of the loss of important detail if the image is excessively post-processed.

The navigation map 30 and collection of high resolution images are stored locally in computer memory in a computer or server 15. For a typical 20×50 mm specimen as described in the introduction, such a collection of high resolution images could be expected, with 50–100-fold digital compression, to occupy up to around 1 Gb of memory. Typically, a compressed navigation map might be expected to occupy around 50 Kb of memory.

At this stage, access to the microscope is no longer required and it can be put to use on the next slide. Communication may now be made between the local server 15 and the consultant at a remote computer 16, upon which is mounted the appropriate client software. Communication may be via a dedicated link, for example to a centralised expert diagnostic centre, or by any other suitable means, such as over the Internet even to a consultant's portable computer. The system is not limited to one:one connections. The server can be configured to support simultaneous access by multiple clients.

At his client computer 16, the consultant receives the low resolution 'navigation map' 30 of the entire specimen image from which he can access the high resolution images. As the compressed navigation map is comparatively small, there is only a minimal delay whilst the data is transferred. In its simplest form, an original high resolution image itself is retrieved simply by clicking or otherwise selecting the appropriate area in the navigation map 30. In another embodiment, the consultant is able to select any specific area of interest by "rubber banding" a rectangular region either on the client's navigation map display, or else on the currently displayed field of view. The server then extracts the appropriate high resolution image from a very large compressed file, then compresses this field-of-interest view and sends it to the client computer 16.

Typically, the consultant will have two computer monitors, the first monitor 35 to continually display the navigation map 30 and the second monitor 36 to allow the consultant to display a high resolution image 40 of an area 41 selected by the consultant by "rubberbanding" a desired area from the map 30 using, for example, a mouse connected to his terminal. The server 15 will immediately access the image store and construct a compressed image corresponding to the selected area for transmission to the client computer. In the limit of magnification, the enlarged image 40 on the second monitor 36 will typically correspond to the magnification used in the scanning procedure, but it could typically be digitally enlarged up to around twice the scanned magnification without loss of apparent image quality.

In a further preferred embodiment the remote consultant will be able to reconstruct the navigation map. If for example, it is clear at first sight that 50% of the navigation map 30 shows nothing at all or is not relevant to the diagnosis, it may be distracting for the consultant to have it constantly displayed on the first screen 35. Accordingly, the consultant can 'rubberband' the desired area and the server will construct a new navigation map and transmit it to the client computer. Thus the new navigation map may be at the same resolution as the original map or at an increased resolution as desired.

An advantage of the present system is that the complex and storage intensive data processing is carried out by the server 15 locally to the microscope, such that only that image data called upon by the consultant needs to be transmitted to the consultant's computer 16. That data is comparatively small and can thus be transmitted quickly. The client computer 16 is not required to carry out any complex data processing other than decompression and display of the images retrieved from the server. In addition, the server can be configured to allow multiple concurrent accessing of the data, for the purposes, for example, of multiple diagnosis or teaching.

In the preferred embodiment illustrated, the second monitor 36 also displays small thumbnail images 45 of areas previously examined in detail as an enlarged image 41. These thumbnail images 45 are temporarily stored locally to facilitate rapid retrieval should the consultant so require. Ultimately, the original image data corresponding to the thumbnail images, and including the navigation map image 30, can be stored centrally constituting a part of the patient's medical records and also serving as an 5 audit trail recording those areas of the slide which were actually examined by the consultant. The remaining high resolution images on the server can be discarded or backed up as desired. This illustrates a yet further advantage of the present invention. It is inherently well adapted for efficient data warehousing and provides a useful compromise between storing the whole data and storing no data. Neither of the existing dynamic or static telemicroscopy techniques can provide such a feature without considerable additional modification.

Use of the present invention allows the remote consultant access to any area of the slide at will, and allows him to control magnification at will. In many applications, it is as fast as direct examination of the local slide.

Having described the use of two screens, it will be immediately apparent that the same result can be achieved using separate virtual screens or windows within a GUI operating system upon the same monitor screen.

The apparatus and method of the present invention are particularly well suited to the majority of occasions where an immediate diagnosis is not required and its primary advantage is in the speeding up of non-urgent cases. It avoids the need for microscope samples to be transferred between hospitals, being advantageous both in terms of reducing the delays due to samples being in transit and the risks associated with transferring possibly dangerous samples. However, the invention is also potentially suitable for those cases where an immediate diagnosis is required, for example when a frozen section sample has been taken from a patient during an exploratory operation. This feature will be particularly advantageous in highly specialised areas of medicine in which there may be only a few suitably experienced clinicians who may well be in other parts of the world when a diagnosis is required.

In summary, the present invention overcomes the stated limitations of static telemicroscopy without the high cost entailed in dynamic telemicroscopy. Cost saving is primarily through reduction of consultant time. This is essential to [realise] *realize* the potential benefits to quality of diagnosis in routine telepathology etc. Furthermore, the scanning process can easily be adapted to unattended [hatch] *batch* processing, in which, not just one slide but a collection of slides is scanned sequentially.

The simplicity of providing multiple access to the server makes the invention ideal for teaching purposes, as well as for professional quality assurance assessment.

The concepts described above can be applied as a teaching apparatus and for professional quality assurance by providing the apparatus with a return path in which the apparatus returns information about the fields of view selected by the operator. The apparatus may also provide means for enabling annotation to be inserted by a user to provide total feedback of the user's approach to a monitoring teacher.

With such an arrangement it is not necessary to return actual images, but simply to return the bounds information on the boundaries of the field within the frame of reference of the large-scale virtual image. This is because the teacher has access to an exact copy and reconstruction can be performed at the teacher's server. In this way, an entire diagnostic session can be returned in a file which can be easily transmitted by E-mail or on a floppy disk, for example.

Whilst, as with the above example, the image provider (teacher) and the image reviewer (the student) can be at either end of a local area network or other telecommunications, other possibilities are available. For example an appropriate data storage device, such as a CD-ROM could incorporate all of the image data and when loaded into an appropriately configured PC can emulate a remotely accessed system.

What is claimed is:

1. A method of telemicroscopy comprising the steps of:

preparing a complete specimen on a microscopy slide, the complete specimen occupying an area of the microscopy slide;

placing the slide upon the stage of a microscope equipped with a high power objective lens, digital imaging apparatus and motorized stage;

imaging said area of the microscopy slide using the high power objective lens to obtain a single scan of the complete specimen at high magnification and high resolution to provide data for a high resolution image of every portion[.] of the specimen;

wherein the step of imaging comprises obtaining a [continuos] *continuous* sequence of successive images by advancing the field of view of the high power objective lens of the microscope stepwise across the complete specimen and acquiring successive images of each field of view for the complete specimen;

digitally processing the high resolution image data to obtain data for a relatively low resolution copy of the composite image of the complete specimen; and storing the high resolution image data and the low resolution copy of the image data in a datastore;

wherein the method further comprises the steps of transferring the low resolution copy of the image data from the datastore to a remote terminal for displaying a corresponding low resolution image, as a navigation map, upon a monitor of the terminal; and in response to a selection, by a user of the terminal, of an area of the navigation map, transferring corresponding high resolution image data for the selected area of the image from the datastore to the terminal.

2. The method according to claim 1, further comprising the step of recording the areas of the low resolution image that are selected, for review of performance of said user.

3. A telemicroscopy apparatus comprising a microscope provided with a high power objective lens, a digital imaging apparatus and a motorized stage, wherein the apparatus is controllable to obtain[,] a single scan of the complete specimen at a high magnification and high resolution to provide high resolution digital image data of every portion of the specimen occupying an area of a microscopy slide placed upon the stage comprising a continuous sequence of successive images by advancing the field of view of the high power objective lens stepwise across the complete specimen thereby acquiring successive images of the entire field of view for the complete specimen;

image processing means to process the high resolution digital image data to obtain a low resolution copy of the image data;

storage means to store the high resolution image data and the low resolution copy of the image data thereby obtained; and means for transferring the low resolution copy of the image data from the datastore to the remote terminal for displaying a corresponding low resolution image, as a navigation map, upon a monitor of the terminal; and in response to a selection, by a user of the terminal, of an area of the navigation map, means for transferring corresponding high resolution image data for the selected area of the image from the datastore to the terminal.

4. The apparatus according to claim 3, wherein the digital imaging apparatus is a digital camera.

5. The apparatus according to claim 3, comprising means for moving the objective lens of the microscope in order to provide automatic focusing.

6. The apparatus according to claim 3, comprising means for recording what image data is requested for review of the performance of a user.

[7. The apparatus according to claim 6, wherein the recording means is a data storage disk, such as a floppy disk.]

8. A method for acquiring image data for use in telemicroscopy, the method comprising the steps of:

placing a microscopy slide containing a prepared complete specimen upon a stage of a microscope equipped with a high power objective lens, digital imaging apparatus and motorized stage;

imaging an area of the complete specimen using the high power objective lens to obtain a single scan of the complete specimen at high magnification and high resolution to provide a high resolution image of every portion of the specimen; and digitally processing the high resolution digital image data to obtain a relatively low resolution copy of the image data, wherein the step of imaging comprises;

obtaining a continuous sequence of successive images by advancing the field of view of the high power objective lens of the microscope stepwise across the complete specimen and acquiring successive images of each field of view for the complete specimen;

transferring the low resolution copy of the image data from the datastore to a remote terminal for displaying a corresponding low resolution image, as a navigation map, upon a monitor of the terminal; and in response to a selection, by a user of the terminal, of an area of the navigation map, transferring corresponding high resolution image data for the selected area of the image from the datastore to the terminal.

9. The method according to claim 8, further comprising: storing the high resolution image data and the low resolution copy of the image data in a datastore.

10. The method according to claim 8, wherein during the imaging, the method further comprises periodically refocusing the microscope by moving the objective lens relative to the microscopy slide.

11. The method according to claim 9, further comprising processing the image data acquired for each image of each field of view, and storing the processed data in a datastore.

12. The method according to claim 11, wherein the processing comprises one or more of digital image compression, and processing to remove peripheral shading around each image of each field of view.

13. A method of telemicroscopy comprising the steps of:

acquiring image data for a specimen using the method according to claim 8;

allowing access to the datastore from the remote terminal;

transferring the data for the low resolution copy of the image data to the terminal, and displaying a corresponding low resolution image upon the monitor; and in response to user selection, by means of the terminal, of an area of the low resolution image, transferring corresponding high resolution image data for that area from the datastore to the terminal.

14. The method according to claim 13, wherein the user selection is achieved by selecting an area of the low resolution image displayed on a monitor of the terminal.

15. The method according to claim 13, further comprising the step of recording the areas of the low resolution image that are selected, for review of performance of a person performing the method.

16. A telemicroscopy apparatus comprising:

a microscope provided with a high power objective lens;

a digital imaging apparatus and a motorized stage for obtaining a single scan of [the] *a* complete specimen at high magnification and high resolution to provide high resolution digital image data of every portion of the specimen and obtaining a continuous sequence of successive images by advancing the field of view of the high power objective lens of the microscope stepwise across the complete specimen and acquiring successive images of each field of view for the complete specimen; on a microscopy slide placed upon the stage;

image processing means to process the high resolution digital image data to obtain a low resolution copy of the image data;

storage means to store the high resolution image data and the low resolution copy of the image data thereby obtained; and means for transferring the low resolution copy of the image data from the datastore to the remote terminal for displaying a corresponding low resolution image, as a navigation map, upon a monitor of the terminal; and in response to a selection, by a user of the terminal, of an area of the navigation map, means for transferring corresponding high resolution image data for the selected area of the image from the datastore to the terminal.

17. The apparatus according to claim 16, wherein the digital imaging apparatus is a digital camera.

18. The apparatus according to claim 16, comprising means for moving the high power objective lens of the microscope in order to provide automatic focusing.

19. The apparatus according to claim 16, comprising means for recording what image data is requested for review of the performance of a user.

20. The apparatus according to claim 19, wherein the recording means is a data storage disk, such as a floppy disk.

21. A method for acquiring image data of a specimen for use in telemicroscopy, the method comprising the steps of:

imaging the specimen using a high power digital microscope for obtaining a continuous sequence of successive images by advancing the field of view of the high power digital microscope [stepswise] *stepwise* across the complete specimen and acquiring successive images of each field of view for the complete specimen to obtain high resolution digital image data of the whole specimen in a single scan; and digitally processing the high resolution digital image data to obtain a relatively low resolution copy of the image data;

transferring the low resolution copy of the image data from the datastore to a remote terminal for displaying a corresponding low resolution image, as a navigation map, upon a monitor of the terminal; and in response to a selection, by a user of the terminal, of an area of the navigation map, transferring corresponding high resolution image data for the selected area of the image from the datastore to the terminal.

22. A telemicroscopy apparatus for imaging a specimen comprising:

a high resolution digital microscope being controllable for obtaining a single scan of the complete specimen at high magnification and high resolution to provide a high resolution digital image data of every portion of the specimen and a continuous sequence of successive images by advancing the field of view of the high power objective lens of the microscope stepwise across the complete specimen and acquiring successive images of each field of view for the complete specimen; to obtain high power digital image data of the entire specimen;

image processing means to process the high resolution digital image data to obtain a low resolution copy of the image data;

storage means to store the high resolution image data and the low resolution copy of the image data thereby obtained; and means for transferring the low resolution copy of the image data from the datastore to the remote terminal for displaying a corresponding low resolution image, as a navigation map, upon a monitor of the terminal; and in response to a selection, by a user of the terminal, of an area of the navigation map, means for transferring corresponding high resolution image data for the selected area of the image from the datastore to the terminal.

*23. A method of using a microscopy system, the method comprising:*

*preparing an entire specimen on a microscopy slide, the entire specimen occupying an area of the microscopy slide;*

*placing the slide upon a stage of a microscope equipped with a high power objective lens, digital imaging apparatus, and the stage;*

*imaging said area of the microscopy slide using the high power objective lens to obtain a single scan of the entire specimen at high magnification and high resolution to provide data for a high resolution image of every portion of the specimen;*

*wherein the step of imaging comprises obtaining a continuous sequence of successive images by advancing the field of view of the high power objective lens of the microscope stepwise across the entire specimen and acquiring successive high resolution images of each field of view for the entire specimen;*

*digitally processing the high resolution image data to obtain data for a relatively low resolution copy of the composite image of the entire specimen; and*

*storing the high resolution image data and the low resolution copy of the image data in a datastore;*

*wherein the method further comprises:*

*transferring the low resolution copy of the image data from the datastore to a remote terminal for displaying a corresponding low resolution image, as a navigation map, upon a monitor of the terminal;*

*in response to a selection, by a user of the terminal, of an area of the navigation map, transferring corresponding high resolution image data for the selected area of the image from the datastore to the terminal; and*

*simultaneously displaying the corresponding low resolution image, as a navigation map, along with a high resolution image corresponding to the high resolution image data for the selected area of the image, at the remote terminal.*

*24. The method according to claim 23, further comprising the step of recording the areas of the low resolution image that are selected, for review of performance of said user.*

*25. A microscopy system comprising:*

*a microscope provided with a high power objective lens, a digital imaging apparatus, and a stage;*

*wherein the apparatus is controllable to obtain a single scan of an entire specimen at high magnification and high resolution to provide high resolution digital image data of every portion of the specimen occupying an area of a microscopy slide placed upon the stage comprising a sequence of successive images obtained by advancing the field of view of the high power objective lens stepwise across the entire specimen thereby acquiring successive high resolution images of the entire field of view for the entire specimen;*

*an image processor to process the high resolution digital image data to obtain a low resolution copy of the image data;*

*a datastore to store the high resolution image data and the low resolution copy of the image data thereby obtained; and*

*means for transferring the low resolution copy of the image data from the datastore to a remote terminal for displaying a corresponding low resolution image, as a navigation map, upon a monitor of the terminal; and*

*in response to a selection, by a user of the terminal, of an area of the navigation map, means for transferring corresponding high resolution image data for the selected area of the image from the datastore to the terminal;*

*wherein the remote terminal simultaneously displays the corresponding low resolution image, as a navigation map, along with a high resolution image corresponding to the high resolution image data for the selected area of the image, at the remote terminal.*

*26. The system according to claim 25, wherein the digital imaging apparatus is a digital camera.*

*27. The system according to claim 25, comprising means for moving the objective lens of the microscope in order to provide automatic focusing.*

*28. The system according to claim 25, comprising means for recording what image data is requested for review of the performance of a user.*

*29. The system according to claim 28, wherein the recording means is a data storage disk.*

*30. A method for acquiring image data for use in a microscopy system, the method comprising:*

*placing a microscopy slide containing an entire specimen upon a stage of a microscope equipped with a high power objective lens, digital imaging apparatus, and the stage;*

*imaging an area of the entire specimen using the high power objective lens to obtain a single scan of the entire specimen at high magnification and high resolution to provide data for a high resolution image of every portion of the specimen; and*

*digitally processing the high resolution digital image data to obtain a relatively low resolution copy of the image data, wherein the imaging comprises:*

*obtaining a continuous sequence of successive images by advancing the field of view of the high power objective lens of the microscope stepwise across the entire specimen and acquiring successive high resolution images of each field of view for the entire specimen;*

*transferring the low resolution copy of the image data from a datastore to a remote terminal for displaying a corresponding low resolution image, as a navigation map, upon a monitor of the terminal;*

*in response to a selection, by a user of the terminal, of an area of the navigation map, transferring corresponding high resolution image data for the selected area of the image from the datastore to the terminal; and*

*simultaneously displaying the corresponding low resolution image, as a navigation map, along with a high resolution image corresponding to the high resolution image data for the selected area of the image, at the remote terminal.*

*31. The method according to claim 30, further comprising:*

*storing the high resolution image data and the low resolution copy of the image data in a datastore.*

*32. The method according to claim 30, wherein during the imaging, the method further comprises periodically refocusing the microscope by moving the objective lens relative to the microscopy slide.*

*33. The method of claim 30, further comprising processing the image data acquired for each image of the high resolution images, and storing the processed data in a datastore.*

*34. The method according to claim 33, wherein the processing comprises one or more of digital image compression, and processing to remove peripheral shading around each image of the high resolution images.*

*35. A method of using a microscopy system, the method comprising:*

*acquiring image data for a specimen using the method according to claim 30;*

*allowing access to the datastore from the remote terminal;*

*transferring the data for the low resolution copy of the image data to the terminal;*

*displaying a corresponding low resolution image upon a monitor; and*

*in response to user selection, by means of the terminal, of an area of the low resolution image, transferring corresponding high resolution image data for that area from the datastore to the terminal.*

*36. The method according to claim 35, wherein the user selection is achieved by selecting an area of the low resolution image displayed on a monitor of the terminal.*

*37. The method according to claim 35, further comprising the step of recording the areas of the low resolution image that are selected, for review of performance of a person performing the method.*

*38. A microscopy system comprising:*

*a microscope provided with a high power objective lens;*

*a digital imaging apparatus and a stage for obtaining a single scan of an entire specimen on a microscopy slide placed upon the stage at high magnification and high resolution to provide high resolution digital image data of every portion of the specimen and obtaining a continuous sequence of successive images by advancing the field of view of the high power objective lens of the microscope stepwise across the entire specimen and acquiring successive high resolution images of each field of view for the entire specimen;*

*an image processor to process the high resolution digital image data to obtain a low resolution copy of the image data;*

*a datastore to store the high resolution image data and the low resolution copy of the image data thereby obtained; and*

*means for transferring the low resolution copy of the image data from the datastore to a remote terminal for displaying a corresponding low resolution image, as a navigation map, upon a monitor of the terminal; and*

*in response to a selection, by a user of the terminal, of an area of the navigation map, means for transferring corresponding high resolution image data for the selected area of the image from the datastore to the terminal;*

*wherein the remote terminal simultaneously displays the corresponding low resolution image, as a navigation map, along with a high resolution image corresponding to the high resolution image data for the selected area of the image, at the remote terminal.*

*39. The system according to claim 38, wherein the digital imaging apparatus is a digital camera.*

*40. The system according to claim 38, comprising means for moving the high power objective lens of the microscope in order to provide automatic focusing.*

*41. The system according to claim 38, comprising means for recording what image data is requested for reviewing of the performance of user.*

*42. The system according to claim 41, wherein the recording means is a data storage disk.*

*43. A method for acquiring image data of a specimen for use in a microscopy system, the method comprising:*

*imaging the specimen using a high power digital microscope for obtaining a continuous sequence of successive images by advancing the field of view of the high power digital microscope stepwise across the entire specimen and acquiring successive high resolution images of each field of view for the entire specimen to obtain high resolution digital image data of the entire specimen in a single scan;*

*digitally processing the high resolution digital image data to obtain a relatively low resolution copy of the image data;*

*transferring the low resolution copy of the image data from a datastore to a remote terminal for displaying a corresponding low resolution image, as a navigation map, upon a monitor of the terminal;*

*in response to a selection, by a user of the terminal, of an area of the navigation map, transferring the corresponding high resolution image data for the selected area of the image from the datastore to the terminal; and*

*simultaneously displaying the corresponding low resolution image, as a navigation map, along with a high resolution image corresponding to the high resolution image data for the selected area of the image, at the remote terminal.*

*44. A microscopy system for imaging a specimen comprising:*

*a high resolution digital microscope being controllable for obtaining a single scan of the entire specimen at high magnification and high resolution to provide high resolution digital image data of every portion of the specimen and a continuous sequence of successive images by advancing the field of view of a high power objective lens of the microscope stepwise across the entire specimen and acquiring successive high resolution images of each field of view for the entire specimen to obtain high power digital image data for the entire specimen;*

*an image processor to process the high resolution digital image data to obtain a low resolution copy of the image data;*

*a datastore to store the high resolution image data and the low resolution copy of the image data thereby obtained;*

*means for transferring the low resolution copy of the image data from the datastore to a remote terminal for displaying a corresponding low resolution image, as a navigation map, upon a monitor of the terminal; and*

*in response to a selection, by a user of the terminal, of an area of the navigation map, means for transferring corresponding high resolution image data for the selected area of the image from the datastore to the terminal;*

*wherein the remote terminal simultaneously displays the corresponding low resolution image, as a navigation map, along with a high resolution image corresponding to the high resolution image data for the selected area of the image, at the remote terminal.*

* * * * *